United States Patent [19]

Fong

[11] Patent Number: 4,703,092
[45] Date of Patent: Oct. 27, 1987

[54] PROCESS OF MAKING N-(2-HYDROXY-3-SULFOPROPYL) AMIDE CONTAINING POLYMERS

[75] Inventor: Dodd W. Fong, Naperville, Ill.

[73] Assignee: Nalco Chemical Company, Oak Brook, Ill.

[21] Appl. No.: 9,563

[22] Filed: Jan. 30, 1987

Related U.S. Application Data

[63] Continuation of Ser. No. 796,451, Nov. 8, 1985, abandoned.

[51] Int. Cl.$^4$ .................................................. C08F 8/34
[52] U.S. Cl. ................................. 525/351; 525/329.4
[58] Field of Search ........................ 525/348, 351, 353

[56] References Cited

U.S. PATENT DOCUMENTS

| | | | |
|---|---|---|---|
| 3,039,870 | 6/1962 | Laakso | 526/262 |
| 3,585,172 | 6/1971 | Nishiyama | 525/380 |
| 3,803,087 | 4/1974 | Vaughn | 525/380 |

FOREIGN PATENT DOCUMENTS

| | | |
|---|---|---|
| A10023712 | 2/1981 | European Pat. Off. |
| 1246953 | 9/1971 | United Kingdom |
| 1266224 | 3/1972 | United Kingdom |
| 1562308 | 3/1980 | United Kingdom |
| A2082600 | 3/1982 | United Kingdom |
| A2142035 | 6/1985 | United Kingdom |

OTHER PUBLICATIONS

Industrial and Engineering Chemistry, vol. 48, (1956), pp. 2132–2135, (Article entitled "Ionic Derivatives of Polyacrylamide", by A. M. Schiller and T. J. Suen).

The Chemistry of Amides, Jacob Zabicky, ed., Interscience Publishers (1970), Chapter 13, "Reactions of the Carboxamide Group", Brian C. Challis and Judith A. Challis, Imperial College, London.

The Chemistry of Amides, Jacob Zabicky, ed., Chapter 2, 1. J. Am. Chem. Soc., 65, 1566, (1943), 2. J. Org. Chem., 24, 895, (1959), and 3. J. Org. Chem., 26, 2563, (1961).

Primary Examiner—Christopher Henderson
Attorney, Agent, or Firm—John G. Premo; Donald G. Epple

[57] ABSTRACT

A high temperature, pressurized process is described to synthesize sulfonated acrylamide polymers represented by the structure:

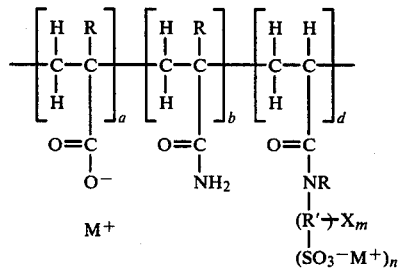

8 Claims, No Drawings

PROCESS OF MAKING N-(2-HYDROXY-3-SULFOPROPYL AMIDE CONTAINING POLYMERS

CROSS REFERENCE TO RELATED APPLICATION

This application is a continuation of co-pending application Ser. No. 796,451 filed on 11/8/85, now abandoned.

The synthesis of water-soluble sulfonated polymers has generally been limited to the use of certain vinyl monomers containing the sulfonate functional group. An example of these monomers are sodium vinyl sulfonate, sulfonated styrene, and AMPS (2-acrylamido-2-methyl propane sulfonic acid). In addition, the synthesis of vinylic sulfonated polymers containing the sulfonate group has been limited from the point of view that only certain of these kinds of sulfonated monomers are commercially produced.

As a result, the use of these sulfonated water-soluble polymers is limited only to the structures mentioned above. It would therefore be an advance in the art if other water-soluble polymeric chemical structures could be synthesized on a polymeric backbone which structures would contain the sulfonate group, either in the acid or salt form, and which structures might also contain other functional groups which could enhance the use of these water-soluble sulfonated polymers in certain applications such as dispersants in water treatment, scale inhibitors in natural and industrial waters, flocculants and coagulants, and the like.

It is therefore an object of this invention to create water-soluble polymers containing a sulfonate group and, in addition, which polymers may also contain other functional groups which may be useful when applied to aqueous solutions or environments.

It is another object of this invention to develop a synthetic procedure which can generally be applicable to the synthesis of various types of water-soluble polymers containing the sulfonate group with or without the additional presence of other functional groups which may be useful when these polymers are added to aqueous systems.

It is another object of this invention to synthesize and recover certain types of sulfonate containing water-soluble polymers which polymers may contain other functional groups such as hydroxyl, chloro, bromo, iodo, and/or mixtures thereof, which polymers have not heretofor been known or used.

THE INVENTION

I have discovered a process for modifying water-soluble polymers containing pendant amide functional groups, such polymers primarily derived from acrylamide containing vinylic polymers/copolymers or from alkyl substituted acrylamide containing vinylic polymers or copolymers, and which polymers/copolymers are water soluble and contain pendant amide functional groups derived from acrylamide, methyl acrylamide, ethylacrylamide, and the like.

The process which I have discovered is a process that uses the equivalent of a transamidation reaction with the pendant amide group on the polymer and a chemical reactant represented by the structure:

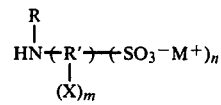

Formula I wherein
R is individually chosen, in each occurrence, from the group consisting of hydrogen and lower alkyl groups containing from 1-4 carbon atoms;
M is chosen from the group consisting of hydrogen, alkali metal, alkaline earth metal and ammonium ions, and mixtures thereof;
R' is a multi-valent hydrocarbonaceous bridging group which may be linear, branched, cyclic, aromatic, heterocyclic, and mixtures thereof, and having from 1-16 carbon atoms;
X is chosen from Cl, Br, I, OH and mixtures thereof; and wherein,
m ranges between 0 and 16,
n ranges between 1 and 16, provided that the sum of m+n is between 1-20.

THE CHEMICAL REACTANT

The chemical reactant described above is primarily an amino substituted compound which also contains the sulfonate functional group, and wherein the amine functional group contains at least one active hydrogen substituted on the amino nitrogen. Although sulfonate compounds having both primary and secondary amines can react under my transmission reaction conditions to achieve modified sulfonate containing polymers, it is preferable that when a secondary amine is chosen to accomplish this modification of pendant amide containing polymers, that the alkyl group substituted on the amino nitrogen contain no more than 4 carbon atoms, i.e. the alkyl substitution should be limited to methyl, ethyl, propyl and butyl functionality, and isomers thereof.

However, it is most preferred that the amine substitution on the sulfonate containing chemical reactant be a primary amino functional group. When a primary amino functional group is used to accomplish the transamidation reaction, the reaction easily proceeds so as to incorporate at least 25, and preferably 60, mole percent of the chemical reactant used into the water-soluble polymer chain containing pendent amide groups, substituting therefore a sulfonate containing functionality for what was originally the pendant amide functionality.

In addition to the amine substitution in the chemical reactant described above, this chemical reactant does contain at least one sulfonate functional group in either its acid form or its salt form, wherein the salt form is chosen from a salt of an alkali metal, an alkaline earth metal, tertiary amines, and ammonium ions, and mixtures thereof. The salt form may be in existence prior to the transamidation reaction or it may be synthesized by varying pH with bases containing alkali metals, alkaline earth metals, tertiary amines, or ammonia, either prior to, during the transamidation reaction or after the transamidation reaction has been completed.

In addition to the sulfonate functional group and the amine functional group, the chemical reactant may also contain other functional groups chosen from the groups consisting of chlorine, bromine, hydroxyl, and mixtures thereof. Preferably, the chemical reactant is limited to contain a primary amino group responsible for the transamidation reaction, at least one sulfonate group which allows the formation of an anionic sulfonate containing water-soluble polymer, and an hydroxyl group or a chloro functional group, the presence of which may enhance the activity of water-soluble sulfonate containing polymers synthesized by my process.

Most preferably, the chemical reactant contains a primary amine, zero or more hydroxyl groups, and one or more sulfonate groups either in the free acid form, salt form, or mixtures of the free acid and salt forms.

Several preferred species of the chemical reactant described above are demonstrated in the following formulations:

Formula II

| | |
|---|---|
| $H_2N-CH_2SO_3M$ | a. |
| $H_2N-CH_2CH-SO_3M$<br>$\quad\quad\quad\quad\mid$<br>$\quad\quad\quad\quad OH$ | b. |
| $H_2N-CH_2CH_2-SO_3M$ | c. |
| $H_2N-CH_2-CH-CH_2SO_3M$<br>$\quad\quad\quad\quad\mid$<br>$\quad\quad\quad\quad OH$ | d. |

THE PENDENT ACRYLAMIDE CONTAINING POLYMERS

The pendant acrylamide containing polymers are water-soluble polymers which have a general structure allowing the presence of a pendant amide group as demonstrated in Formula III:

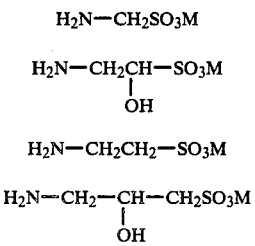

Formula III

In Formula III, as one can observe, the pendant amide group may be a primary amide, a secondary amide, or a tertiary amide compound and mixtures thereof. Preferably, to obtain reasonable conversions of these pendant amide groups to the sulfonate containing functional groups described above, the pendant amide group is a primary amide group.

The most likely water-soluble polymers containing pendant amide functionality which polymers are easily modified under the conditions of my transamidation reaction, are those water-soluble polymers described by Formula IV:

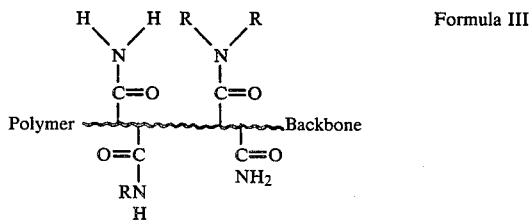

Formula IV

In Formula IV,

R is independently chosen, at each occurrence, from the group consisting of hydrogen, and lower alkyl groups containing from 1-4 carbon atoms;

M is independently chosen, at each occurrence, from hydrogen, alkali metals, alkaline earth metal and ammonium ions and mixtures thereof;

and a and b are integers having the following relationships:

a/b ranges between 0 to 100, and a+b is sufficient so as to provide a polymer having a molecular weight of at least 1,000. Preferably the sum a+b is sufficient to provide a molecular weight ranging between about 1,000-20,000,000.

As can be seen, the polymers described above may be homopolymers of acrylamide or its alkyl homologs, i.e. methacrylamide and the like, they may be copolymers of acrylamide with acrylic acid or its homologs such as methacrylic acid and the like, or they may be terpolymers and above with other monomers of a vinylic nature which contain acrylamide and acrylic acid, and their homologs such as methacrylic acid, methacylamide, and the like.

THE CHEMICAL REACTION

The chemical reaction which is preferred to obtain the sulfonated polymers of this invention is a reaction which can generally be referred to as a transamidation reaction. This reaction substitutes an amine compound which may also contain other functional groups such as the sulfonate function group for the nitrogen portion of a pendant amide group contained on a polymeric backbone as described above. This transamidation reaction has been discovered to be a general reaction which can achieve the substitution of my amine and sulfonate containing moiety for the amide nitrogen group of the pendant amide functionality of a water-soluble polymer, thereby obtaining unique sulfonated polymers.

The reaction conditions require that polymers containing pendant amide groups be dissolved or readily dispersed in a solvent which is a common solvent for the chemical reactant of the class described above. In other words, both the polymer which is to be modified and the chemical reactant should be soluble or dispersible in the same solvent system.

Common solvents which have been found useful in this reaction include, but are not limited to, water, dimethylformamide, dimethylsulfoxide, admixtures thereof, and admixtures of these solvents, either singly or taken together with other miscible solvents such as ethanol, tertiary butanol and the like.

A preferred solvent which is a common solvent for both the polymer containing pendant amide groups and the chemical reactants above is water, particularly if the polymer containing pendant amide group is initially water-soluble, as in the case of most acrylamide containing vinylic polymers. Another preferred common solvent for my reaction is a water-in-oil emulsion wherein the dispersed water phase contains dissolved therein both the polymers containing pendant amide groups and the chemical reactants described above.

After having dissolved the polymers containing pendant amide groups in the common solvent, preferably water, the chemical reactant can be added to obtain a solution or dispersion of amide containing polymer and the chemical reactants of this invention. Whether the polymer or the reactant is first added to the common solvent is of no consequence. This admixture is then added to or contained in a reaction vessel capable of withstanding a pressurized chemical reaction, for example, a Paar Bomb type of vessel. The vessel is enclosed and then heated to a temperature of at least 100° C., preferably at least 110° C., and most preferably to a temperature of at least 120° C. If the temperature is increased above 100° C., the vessel contents can expand and the pressure within the vessel can exceed one atmosphere and depending upon the solvent, the sulfonates used or the reactants used, can reach up to about 5 to 15 atmospheres, and possibly more. The pressure within the reaction vessel is a non-controlled variable and is controlled only to the extent that the vessel is enclosed, that a reaction temperature of at least 100° C. or higher is reached, and the vessel may contain solvents or reactants of more or less volatile nature, which solvents and reactants have vapor pressures of such a nature that pressure vessels are required at temperatures above 100° C.

Once the reaction vessel contents have reached at least 100° C., and preferably 110° C., the reaction is allowed to occur for at least 3 minutes at this temperature, and preferably for whatever length of time is necessary to accomplish a minimum of at least a 25 percent conversion of the added amount of chemical reactant. The chemical reactnt is, of course, converted to a pendant sulfonate containing substituted amide being the product of the transamidation chemical reaction summarized above. If the polymer is a homopolymer of acrylamide, methacrylamide, or a copolymer of vinyl amide containing monomers such that no other pendant functional group is present besides amide functional groups, the condition of the reaction is such that at least some degree of amide hydrolysis may also occur in those reactions in which water or a water containing solvent is utilized. In such cases, a carboxylate functional group is also obtained in addition to the sulfonate modified amide and any unreacted starting amide groups from the starting polymer.

Therefore, I have described the chemical reaction or process that accomplishes the synthesis of polymers having the structure:

Formula V

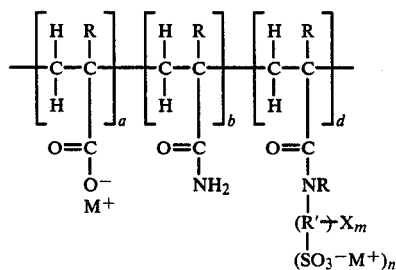

wherein

R is individually chosen at each occurrence from H and lower alkyl ($C_1$–$C_4$) groups;

M is chosen from hydrogen, alkali metal, alkaline earth metal, tertiary amines, and ammonium ion and mixtures thereof;

R' is a multi-covalent hydrocarbonaceous bridging group having from one to sixteen carbon atoms and being chosen from linear, branched, cyclic, aromatic, heterocyclic, and mixtures thereof, functional groups;

X is chosen from Cl, Br, OH, and mixtures thereof; and wherein a, b, and d are integers with the following relationships;

a/b is from zero to 100 b/d is from 0.01 to 100 a/d is from zero to 100, and the sum of a+b+d is sufficient to provide a molecular weight of at least 1000, and the ratio of d:(a+b) is from 20:1 to 1:100;

and wherein m ranges between 0 and 16, and n ranges between 1 and 16, provided that when m is zero, R' is from linear, cyclic, heterocyclic, olefinic, aromatic, and mixtures thereof functional groups, and further provided that the sum of m+n is between 1–20; which process comprises reacting, in a common solvent, at a temperature of at least 100° C.:

A. a polymer having a molecular weight of at least 500, and having pendant amide functional groups, which polymer is represented by the structure:

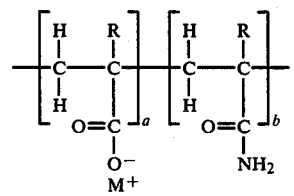

wherein R, M, a, b have the same meanings as above; with,

B. a chemical reactant having the structure:

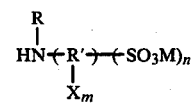

wherein R, R', M, X, m, and n have the meanings above; wherein the mole ratio of chemical reactant to pendant amide groups ranges between about 5:1 to about 1:100; and the reaction occurs for an effective amount of time to accomplish at least a 25 percent conversion of chemical reactant to water-soluble sulfonated polymer; and then recovering the water-soluble sulfonated polymer.

Polymer recovery may be accomplished in several ways known to the person familiar with the art. For example, the polymers may be precipitated by addition of precipitating solvents, or non-solvents, to the reaction mixture. For example, methanol or acetone may be added to the reaction mixture either as is or after concentration by distillation or vacuum distillation to precipitate the polymers. The polymers may also be recovered by vacuum distillation of solvent and unreacted chemical reactant from the reaction product mixture. The polymers may also be recovered by gel permeation chromatographic techniques, however, for the most part the polymers are recovered simply as a solution in the solvent used to perform the transamidation reaction, and used as such.

Preferably, my process is a method to synthesize water-soluble sulfonated polymers having randomly repeated mer units represented by the formula:

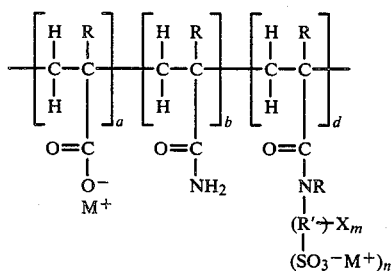

wherein

R is individually chosen at each occurrence from H and lower alkyl ($C_1$–$C_4$) groups;

M is chosen from hydrogen, alkali metal, alkaline earth metal, tertiary amines, and ammonium ions and mixtures thereof;

R' is a multi-covalent hydrocarbonaceous bridging group having from one to sixteen carbon atoms and being chosen from linear alkyl, branched alkyl, cyclic, aromatic, heterocyclic, and mixtures thereof, functional groups; X is chosen from Cl, Br, OH, and mixtures thereof;

and wherein a, b, and d are integers with the following relationships;

a/b is from zero to 100 b/d is from 0.01 to 100 a/d is from zero to 100, and the sum of a+b+d is sufficient to provide a molecular weight of at least 3,000, and the ratio of d:(a+b) is from 20:1 to 1:100;

and wherein m ranges between 0 and 16, and n ranges between 1 and 16, provided that when m is zero, R' is from linear alkyl, cyclic, heterocyclic, olefinic, aromatic, and mixtures thereof functional groups, and further provided that the sum of m+n is from 1 to 20; which process comprises reacting, in a common solvent, at a temperature of at least 100° C.;

A. a polymer having a molecular weight of at least 500, and having pendant amide functional groups, and represented by the structure:

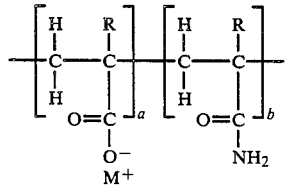

wherein R, M, a, b have the same meanings as above; with

B. a chemical reactant having the structure:

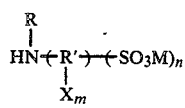

wherein R, R', M, X, m, and n have the meanings above; and wherein the mole ratio of chemical reactant to pendant amide group ranges between about 5:1 to about 1:100; and wherein the reaction occurs for an effective amount of time to accomplish at least an 60 percent conversion of chemical reactant to water-soluble sulfonated polymer; and then recovering the water-soluble sulfonated polymer.

Most preferably, my process is a method for the synthesis of water-soluble sulfonated polymers represented by the formula:

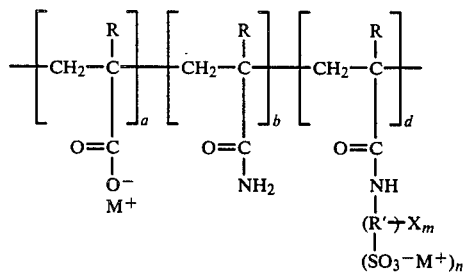

wherein

R is individually chosen at each occurrence from hydrogen and $C_1$ to $C_4$ lower alkyl groups;

M is individually chosen at each occurrence from hydrogen, alkali metals, and ammonium ions, R' is chosen from multi-covalent, branched alkyl, linear alkyl or cyclic hydrocarbonaceous bridging groups having from one to eight carbon atoms;

X is chosen from Cl, OH, and mixtures thereof;

m ranges between 0 to 6;

n ranges between 1 to 4;

a, b, and d are integers with the following relationships:

a/b ranges from 0 to 100, a/d ranges from 0 to 100, b/d ranges from 0.01 to 100, and the ratio d:(a+b) is between about 5:1 to about 1:25, and wherein the occurrence of mer units of a, b, and d is random and the sum of a+b+d will achieve a molecular weight of at least 1000; which process comprises reacting, in an aqueous solvent:

A. a polymer having pendant amide functional groups and represented by the structure:

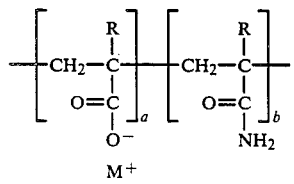

wherein R, M, a, and b have the meanings above and wherein the sum of a+b achieves a molecular weight of at least 500; and B. a chemical reactant having the structure:

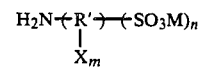

wherein R', M, X, m, and n have the meanings above; under the following reaction conditions:

I. a reaction temperature of at least 100° C. and preferably at least 110° C.;

II. a reaction time of at least ¼ hour and preferably at least ½ hour;

III. a mole ratio of chemical reactant to polymer ranging between about 2:1 to about 1:50;

IV. a pressure ranging from atmospheric pressure to 35 times atmospheric pressure, or more;

thereby achieving the synthesis of the sulfonated polymers described above.

It is particularly of interest that my synthetic procedures permit the synthesis of a sulfonated polymer represented by:

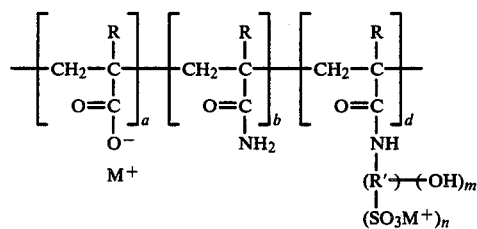

wherein: R is individually chosen, at each occurrence, from the group hydrogen, methyl and ethyl groups;

M is individually chosen, at each occurrence, from the group hydrogen, sodium, potassium, ammonium ions and mixtures thereof;

R' is linear alkylene bridging group having from 1 to 4 carbon atoms;

m is from 0 to 3;

n is from 1 to 3; and a, b, and d are integers having the relationships:
a/d is from 0 to 50,
a/b is from 0 to 50,
b/d is from 0.1 to 20,
d:(a+b) is from 5:1 to 1:10, the sum of a+b+d is sufficient to provide a molecular weight of at least 3,000; which process comprises the reaction, in an aqueous solvent, for at least ¼ hour at a temperature of at least 110° C., in a pressure controlling reactor, of the ingredients:

A. a reactant:

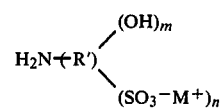

wherein R', M, m and n have the above meanings; and

B. a water-soluble vinyl polymer having pendant amide groups represented by:

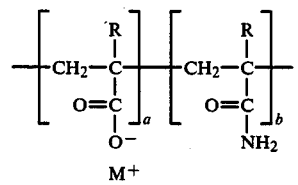

wherein R, M, a, and b have the above meanings; and wherein the mole ratio of reactant to pendant amide groups ranges between about 1:1 to about 1:5; and then recovering the sulfonated polymer.

To further illustrate my invention, I provide the following examples.

EXAMPLE I

In each of the synthetic process below, a low molecular weight of copolymer of acrylic acid and acrylamide was reacted with 1-amino-2-hydroxy propane sulfonic acid in a homogenous aqueous solution. The reactions were achieved at temperatures of at least 100° C. and were achieved on acrylic acid/acrylamide polymeric backbones having various molecular weights.

The compositions of the polymers vary from homopolyacrylamide to 50 mole percent acrylamide and acrylic acid copolymers. The polymers and reactants were charged as aqueous solutions to a Paar Bomb equipped with temperature and pressure measuring devices and also equipped with means to agitate the contents. Temperatures were increased to at least 100° C. in each case. Reaction times ranging from about 20 minutes to in excess of 4 hours accomplished the synthesis of the polymers which are described in Table I.

TABLE I

| Starting Polymer (AA[1]/AcAm[2] mole ratio) | Starting Chemical Reactant (mole %) | Reaction Temperature | Product Polymer (AA/AcAm/ Sulfonated mer unit) | Molecular Weight M.W. | Conversion |
|---|---|---|---|---|---|
| 0 AA/100 AcAm | H$_2$N—CH$_2$—CH(OH)—CH$_2$SO$_3$M(20) | 150° C. | 31/49/20 | 43,100 | 90+% |
| 50 AA/50 AcAm | H$_2$N—CH$_2$—CH(OH)—CH$_2$SO$_3$M(20) | 150° C. | 13/37/13 | 76,600 | 65% |
| 50 AA/50 AcAm | H$_2$N—CH$_2$—CH(OH)—CH$_2$SO$_3$M(20) | 150° C. | 80/5/15 | 18,200 | 75% |
| 25 AA/75 AcAm | H$_2$N—CH$_2$—CH(OH)—CH$_2$SO$_3$M(10) | 150° C. | 40/50/10 | 21,750 | 90+% |
| 25 AA/75 AcAm | H$_2$N—CH$_2$—CH(OH)—CH$_2$SO$_3$M(30) | 150° C. | 50/20/30 | 24,200 | 90+% |
| 25 AA/75 AcAm | H$_2$N—CH$_2$—CH(OH)—CH$_2$SO$_3$M(50) | 150° C. | 50/15/35 | 25,800 | 70% |

TABLE I-continued

| Starting Polymer (AA[1]/AcAm[2] mole ratio) | Starting Chemical Reactant (mole %) | Reaction Temperature | Product Polymer (AA/AcAm/ Sulfonated mer unit) | Molecular Weight M.W. | Conversion |
|---|---|---|---|---|---|
| 25 AA/75 AcAm | $H_2N-CH_2-CH(OH)-CH_2SO_3M$ (75) | 150° C. | 20/10/70 | 28,200 | 90+% |
| 25 AA/75 AcAm | $H_2N-CH_2-CH(OH)-CH_2SO_3M$ (100) | 150° C. | 20/10/70 | 28,600 | 70% |

[1] AA = Acrylic acid mer unit
[2] AcAm = Acrylamide mer unit

In addition, the following polymers would be expected to be synthesized if acrylamide containing polymers were reacted according to the procedures described above with the following chemical reactants: The anticipated products are described in Table II.

TABLE II

| Starting Polymer | Starting Chemical Reactant | Anticipated Product Polymer |
|---|---|---|
| $T\!-\!(CH_2\!-\!CH)_b\!-\!T$ with $O=C-NH_2$ side group | $H_2N-CH_2CH_2SO_3^-Na^+$ | $-(CH_2-CH)_a-(CH_2-CH)_b-(CH_2-CH)_d-$ with side groups $O=C-O^-M^+$, $O=C-NH_2$, $O=C-NH-CH_2-CH_2-SO_3^-Na^+$ |
| " | $H_2N-CH_2CH(OH)CH(OH)CH(OH)CH_2SO_3H$ | $-(AA)_a-(AcAm)_b-(CH_2-CH)_d-$ with side group $O=C-NH-CH_2-CH(OH)-CH(OH)-CH(OH)-CH_2SO_3H$ |
| " | $H_2N-CH_2-CH(Cl)-CH_2-CH_2-SO_3H$ | $-(AA)_a-(AcAm)_b-(CH_2-CH)_d-$ with side group $C=O$, $NH-CH_2-CH(Cl)-CH_2-CH_2-SO_3H$ |
| " | $H_2N-$(cyclohexyl with $SO_3H$, $OH$)$ | $-(AA)_a-(AcAm)_b-(CH_2-CH)_d-$ with side group $O=C-NH-$(cyclohexyl with $OH$, $SO_3H$) |
| $-(AA)_a-(AcAm)_b-$ | $HN(CH_3)-CH_2-CH(OH)-CH(Cl)-CH_2-SO_3H$ | $-(AA)_a-(AcAm)_b-(CH_2-CH)_d-$ with side group $O=C-N(CH_3)-CH_2-CH(Cl)-CH(OH)-CH_2SO_3H$ |
| $[(AA)_a-(AcAm)_b]$ | morpholine with two $CH_2SO_3H$ groups (HN, O ring) | $-(AA)_a-(AcAm)_b-(CH_2-CH)_d-$ with side group $O=C-N$(morpholine ring with $HO_3SCH_2$ and $CH_2SO_3H$) |

TABLE II-continued

| Starting Polymer | Starting Chemical Reactant | Anticipated Product Polymer |
|---|---|---|
| ─(AcAm)$_b$─ | H$_2$N─⟨C$_6$H$_4$⟩─CH$_2$SO$_3$H | ─(AA)$_a$─(AcAm)$_b$─[CH$_2$─CH]$_d$<br>O=C─NH─⟨C$_6$H$_4$⟩─CH$_2$─SO$_3$H |
| ─(AcAm)$_b$─ | H$_2$N─CH$_2$─C(CH$_3$)(CH$_2$OH)─CH$_2$OH | [AA]$_a$─(AcAm)$_b$─[CH$_2$─CH]$_d$<br>C=O, HOCH$_2$─C(CH$_3$)(CH$_2$OH)─CH$_2$─NH |
| ─(AcAm)$_b$─ | H$_2$N─CH(CH$_2$Cl)─CH$_2$OH | [AA]$_a$─(AcAm)$_b$─[CH$_2$─CH]$_d$<br>C=O, NH, Cl─CH$_2$─CH(CH$_2$OH) |
| ─(AcAm)$_b$─ | H$_2$N─CH$_2$─⟨C$_6$H$_4$⟩─SO$_3$H | [AA]$_a$─(AcAm)$_b$─[CH$_2$─CH]$_d$<br>C=O, HO$_3$S─⟨C$_6$H$_4$⟩─CH$_2$─NH |
| ─(CH$_2$─CH)$_x$─(AcAm)$_b$─<br>O=C─O─CH$_3$ | H$_2$N─CH$_2$CH$_2$SO$_3$H | ─(CH$_2$─CH)$_x$─[AA]$_a$─(AcAm)$_b$─[CH$_2$─CH]$_d$<br>O=C─O─CH$_3$ ... C=O─NH─(CH$_2$)$_2$─SO$_3$H |
| ─(AcAm)─ | H$_2$N─CH$_2$─SO$_3$H | [AA]$_a$─(AcAm)$_b$─[CH$_2$─CH]$_d$<br>C=O, HO$_3$S─CH$_2$─NH |
| ─(AcAm)$_b$─ | H─N(CH$_2$CH$_2$SO$_3$H)─CH$_2$CH$_2$SO$_3$H | [AA]$_a$─(AcAm)$_b$─[CH$_2$─CH]$_d$<br>C=O, HO$_3$S─CH$_2$CH$_2$─N─CH$_2$CH$_2$SO$_3$H |
| ─(AcAm)$_b$─ | H─N(CH$_2$CH(OH)CH$_2$SO$_3$H)$_2$ | [AA]$_a$─(AcAm)$_b$─[CH$_2$CH]$_d$<br>C=O, N(CH$_2$─CH(OH)─CH$_2$─SO$_3$H)$_2$ |

TABLE II-continued

| Starting Polymer | Starting Chemical Reactant | Anticipated Product Polymer |
|---|---|---|
| ✦AA✦$_a$✦AcAm✦$_b$ | H$_2$NCH$_2$—CH(OH)—CH$_2$SO$_3$H | ✦AA✦$_a$✦CH$_2$—CH✦$_d$<br>\|<br>C=O<br>\|<br>NH<br>\|<br>CH$_2$<br>\|<br>HC—OH<br>\|<br>CH$_2$SO$_3$H |

Having described my invention, I claim:

1. A process to synthesize water-soluble sulfonated polymers having randomly repeated mer units represented by the formula:

$$\left[\begin{array}{c}H\ R\\|\ \ |\\-C-C-\\|\ \ |\\H\ \ \ \\ \ \ O=C\\ \ \ |\\ \ \ O^-\\ \ \ M^+\end{array}\right]_a \left[\begin{array}{c}H\ R\\|\ \ |\\-C-C-\\|\ \ |\\H\\O=C\\|\\NH_2\end{array}\right]_b \left[\begin{array}{c}H\ H\\|\ \ |\\-C-C-\\|\ \ |\\H\\O=C\\|\\NR\\|\\(R'\!\rightarrow\! X_m)\\|\\(SO_3^-M^+)_n\end{array}\right]_d$$

wherein
- R is individually chosen at each occurrence from H and lower alkyl (C$_1$-C$_4$) groups; P1 M is chosen from hydrogen, alkali metal, alkaline earth metal, tertiary amines, and ammonium ion, and mixtures thereof;
- R' is a multi-covalent hydrocarbonaceous briding group having from one to sixteen carbon atoms and being chosen from bridging groups which are linear alkyl, branched alkyl, cyclic, aromatic, olefinic and mixtures thereof;
- X is OH;

and wherein
- a, b, and d are integers with following relationships;
  - a/b is from zero to 100
  - b/d is from 0.01 to 100
  - a/d is from zero to 100,
  - and the sum of a+b+d is sufficient to provide a molecular weight of at least 1000, and the ratio of d:(a+b) is from 20:1 to 1:100;

and wherein
- m ranges between 0 and 16, and
- n ranges between 1 and 16, provided that when m is zero,
- R' is a bridging group from linear alkyl, cyclic, olefinic ",", aromatic, and mixtures thereof, and further provided that the sum of m+n is from 1 to 20;

which process comprises reacting, in a common solvent, at a temperature of at least 100° C.;

A. a polymer having a molecular weight of at least 500, and having pendant amine functional groups, and represented by the structure:

$$\left[\begin{array}{c}H\ R\\|\ \ |\\-C-C-\\|\ \ |\\H\\O=C\\|\\O^-\\M^+\end{array}\right]_a \left[\begin{array}{c}H\ R\\|\ \ |\\-C-C-\\|\ \ |\\H\\O=C\\|\\NH_2\end{array}\right]_b$$

wherein R, M, a, and b have the same meanings as above; with

B. a chemical reactant having the structure:

$$HN\!-\!(R'\!)\!-\!(SO_3M)_n$$
$$\ \ \ \ |\ \ \ \ \ \ \ \ \ \ |$$
$$\ \ \ \ R\ \ \ \ \ \ \ X_m$$

wherein R, R', M, X, m, and n have the meanings above; and wherein the mole ratio of chemical reactant to pendant amide groups in the polymer ranges between about 5:1 to about 1:100; and reacting at the amide nitrogen group for an effective amount of time to accomplish at least a 25 percent conversion of chemical reactant to sulfonated pendant groups on the polymer; and then recovering the water-soluble sulfonated polymer.

2. The process of claim 1 wherein:
- R is individually chosen at each occurrence from hydrogen, methyl, and ethyl groups,
- M is individually chosen at each occurrence from hydrogen, sodium, potassium, tertiary amines, ammonium and mixtures thereof,
- R' has at least two carbon atoms and is linear, cyclic, aromatic and mixtures thereof;
- X is OH;
- m is from 0 to 4;
- n is from 1 to 4;
- and the molecular weight of the water-soluble sulfonated polymer ranges between about 2000 to about 20,000,000.

3. The process of claim 1 or 2 wherein the common solvent is from the group consisting of water, dimethylformamide, dimethylsulfoxide, and mixtures thereof.

4. The process of claim 1 or 2 wherein the solvent is from the group water and water-emulsified in a continuous oil phase such that the water-soluble sulfonated polymer is recovered either as a water-in-oil emulsion or as an aqueous solution.

5. The synthesis of water-soluble sulfonated polymers represented by the formula:

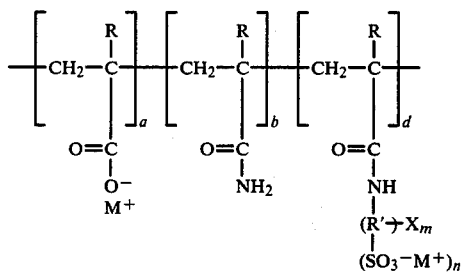

wherein
R is individually chosen at each occurrence from hydrogen and $C_1$ to $C_4$ lower alkyl,
M is individually chosen at each occurrence from hydrogen, alkali metals, tertiary amines, and ammonium ions,
R' is chosen from multi-covalent, branched alkyl, linear alkyl or cyclic hydrocarbonaceous briding groups having from one to eight carbon atoms;
X is OH;
m ranges between 0 to 6;
n ranges between 1 to 4;
a, b, and d are integers with the following relations:
a/b ranges from 0 to 100
a/d ranges from 0 to 100
b/d ranges from 0.01 to 100, and the ratio d:(a+b) is between about 5:1 to about 1:25, and
wherein the occurrence of mer units of a, b, and d is random and the sum of a+b+d will achieve a molecular weight of at least 2,000; which process comprises reacting, in an aqueous solvent:
A. a polymer having pendant amide functional groups and represented by the structure:

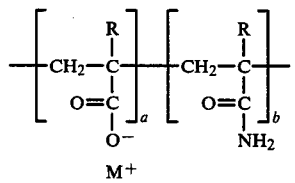

wherein R, M, a, and b have the meanings above and wherein the sum of a+b achieves a molecular weight of at least 500; and
B. a reactant having the structure:

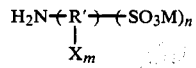

wherein R', M, X, m, and n have the meanings above:
under the following reaction conditions:
I. a reaction temperature of at least 100° C.;
II. a reaction time of at least ¼ hour;
III. a mole ratio of chemical reactant to polymer ranging between about 2:1 to about 1:50;
IV. a pressure ranging from atmospheric pressure to 35 times atmospheric pressure;
thereby achieving the synthesis, and thereafter recovering said sulfonated polymers.

6. The process of claim 5,
wherein

R is individually chosen at each occurrence from hydrogen or methyl
M is individually chosen at each occurrence from hydrogen, sodium, potassium, ammonium and mixtures thereof,
R' is a linear alkylene bridging group having from 2 to 4 carbon atoms;
X is OH;
a, b and d are integers having the following relationships;
a/b ranges from 0 to 50,
a/d ranges from 0 to 50,
b/d ranges from 0.01 to 10, and
d:(a+b) ranges between about 4:1 and 1:20, and the sum of a+b+d is such that the sulfonated polymer has a molecular weight ranging from 2,000–20,000,000, and which process comprises reacting at a temperature of at least 110° C. for at least ½ hour, in a common aqueous solvent,
A. a polymer having the structure:

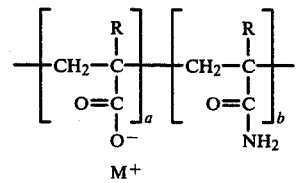

wherein R, M, a, and b have the meanings above and wherein the sum of a+b is such that the molecular weight of the polymer is at least 2,000; with
B. a chemical reactant having the structure:

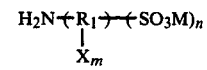

wherein
$R_1$, M, and X are defined above, and
m is from 0 to 3,
n is from 1 to 3, and the sum of m+n is from 1 to 4; and, the ratio of reactant to polymer ranges between about 1:1 to about 1:10, and the reaction pressure is at least 1.25 atmospheres; and then recovering said sulfonated polymer.

7. The process of claim 5 or 6 wherein the solvent is a water-in-oil emulsion.

8. A process for synthesizing a sulfonated polymer represented by:

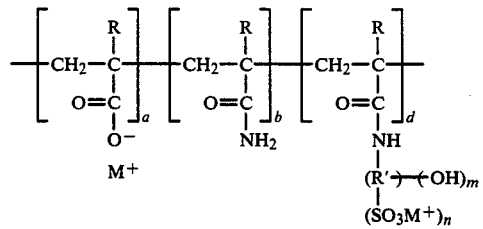

wherein:
R is individually chosen, at each occurrence, from the group hydrogen, methyl and ethyl groups;
M is individually chosen, at each occurrence, from the group hydrogen, sodium, potassium, tertiary amines, and ammonium ions and mixtures thereof;

R' is a linear alkylene bridging group having from 1 to 4 carbon atoms;

m is from 0 to 3;

n is from 1 to 3; and the sum, n+m, is from 1-4;

a, b, and d are integers having the relationships:

a/d is from 0 to 50, a/b is from 0 to 50, b/d is from 0.1 to 20, d:(a+b) is from 5:1 to 1:10, the sum of a+b+d is sufficient to provide a molecular weight of at least 2,000; which process comprises reacting in an aqueous solvent, for at least ½ hour at a temperature of at least 110° C., in a pressure controlling reactor, the ingredients:

A. a chemical reactant:

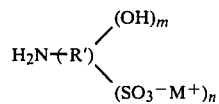

wherein R', M, m and n have the above meanings; and

B. a water-soluble vinyl polymer having pendant amide groups represented by:

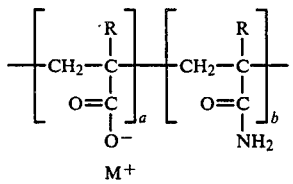

wherein R, M, a, and b have the above meanings; and wherein the mole ratio of reactant to pendant amide groups on the polymer ranges between about 1:1 to about 1:5; and then recovering the sulfonated polymer.

* * * * *

UNITED STATES PATENT AND TRADEMARK OFFICE
CERTIFICATE OF CORRECTION

PATENT NO. : 4,703,092

DATED : OCTOBER 27, 1987

INVENTOR(S) : DODD W. FONG

PAGE 1 of 2

It is certified that error appears in the above-identified patent and that said Letters Patent is hereby corrected as shown below:

Column 15, line 25, Claim 1:

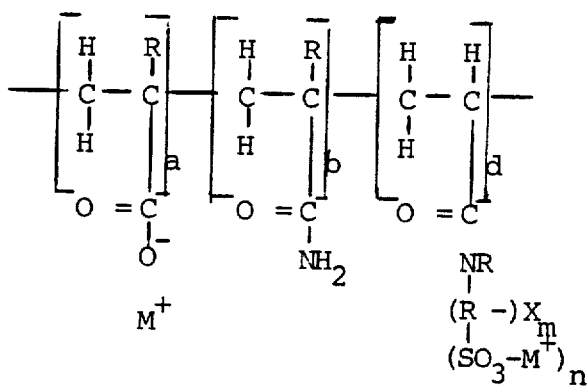

"LETTERS PATENT SHOULD READ AS:"

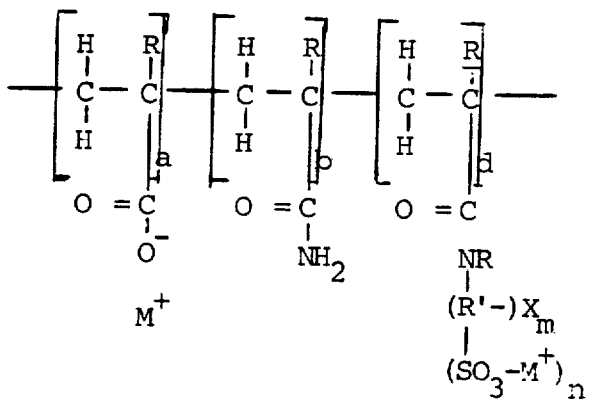

UNITED STATES PATENT AND TRADEMARK OFFICE
CERTIFICATE OF CORRECTION

PATENT NO. : 4,703,092

DATED : OCTOBER 27, 1987

INVENTOR(S) : DODD W. FONG

It is certified that error appears in the above-identified patent and that said Letters Patent is hereby corrected as shown below:

Column 15, line 38, Claim 1:

and lower alkyl $(C_1-C_4)$ groups; Pl M is chosen

"LETTERS PATENT SHOULD READ AS:"

and lower alkyl $(C_1-C_4)$ groups; M is chosen

Signed and Sealed this

Tenth Day of May, 1988

Attest:

DONALD J. QUIGG

*Attesting Officer*  *Commissioner of Patents and Trademarks*